United States Patent
Ruppert et al.

(10) Patent No.: US 10,723,443 B2
(45) Date of Patent: Jul. 28, 2020

(54) BOUNDARY-LAYER-INFLUENCING AERODYNAMIC PART AND METHOD FOR PRODUCING THE SAME

(71) Applicant: Airbus Operations GmbH, Hamburg (DE)

(72) Inventors: Bernd Ruppert, Hamburg (DE); Volker Robrecht, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 579 days.

(21) Appl. No.: 15/458,505

(22) Filed: Mar. 14, 2017

(65) Prior Publication Data
US 2017/0267332 A1 Sep. 21, 2017

(30) Foreign Application Priority Data

Mar. 15, 2016 (DE) .................. 10 2016 204 210

(51) Int. Cl.
*B64C 21/08* (2006.01)
*B64C 21/02* (2006.01)

(52) U.S. Cl.
CPC ........ *B64C 21/025* (2013.01); *B64C 2230/20* (2013.01); *B64C 2230/22* (2013.01); *Y02T 50/166* (2013.01)

(58) Field of Classification Search
CPC ... B64C 21/025; B64C 2230/20; B64C 21/06; B64C 21/04
USPC ....................................................... 244/208
See application file for complete search history.

(56) References Cited

U.S. PATENT DOCUMENTS

| | | | |
|---|---|---|---|
| 5,618,363 | A | 4/1997 | Mullender et al. |
| 7,275,720 | B2 | 10/2007 | Behrens et al. |
| 8,800,915 | B2 | 8/2014 | Gerber |
| 2013/0001837 | A1 | 1/2013 | Goehler et al. |
| 2014/0205454 | A1 | 7/2014 | Giovannetti et al. |

(Continued)

FOREIGN PATENT DOCUMENTS

| | | |
|---|---|---|
| CN | 101348170 A | 1/2009 |
| CN | 102548841 A | 7/2012 |
| DE | 4414205 | 10/1995 |

(Continued)

OTHER PUBLICATIONS

Chinese Office Action for corresponding Chinese Patent Application No. 201701527792.
German Search Report, dated Oct. 6, 2016, Priority Document.

*Primary Examiner* — Reginald S Tillman, Jr.
(74) *Attorney, Agent, or Firm* — Greer, Burns & Crain Ltd.

(57) ABSTRACT

A boundary-layer-influencing aerodynamic part comprises a carrier element provided with at least one air passage aperture for guiding an air flow through the carrier element, an air guiding layer disposed on the carrier element and a cover layer constituting at least a part of a flow surface and being configured to have air flow there through at least in sections. The air guiding layer is configured to have air flow there through with an air flow supplied to the part, at least in certain operating phases of the part, through the cover layer and flowing in the direction of the carrier element or through the air passage aperture of the carrier element and flowing in the direction of the cover layer. The cover layer is applied directly to the air guiding layer via an additive manufacturing method.

17 Claims, 5 Drawing Sheets

(56) References Cited

U.S. PATENT DOCUMENTS

2016/0222796 A1    8/2016  Spangler et al.
2016/0332724 A1*  11/2016  Mehring ............... F28F 13/003

FOREIGN PATENT DOCUMENTS

| DE | 19740502 | 3/1999 |
|----|----------|--------|
| DE | 102009048665 | 3/2011 |
| EP | 0599502 A | 6/1994 |
| EP | 2743451 | 6/2014 |
| GB | 713426 | 8/1954 |
| GB | 2452476 | 3/2009 |
| GB | 2522531 | 7/2015 |
| WO | 2015042009 | 3/2015 |
| WO | 2015183360 | 12/2015 |

* cited by examiner

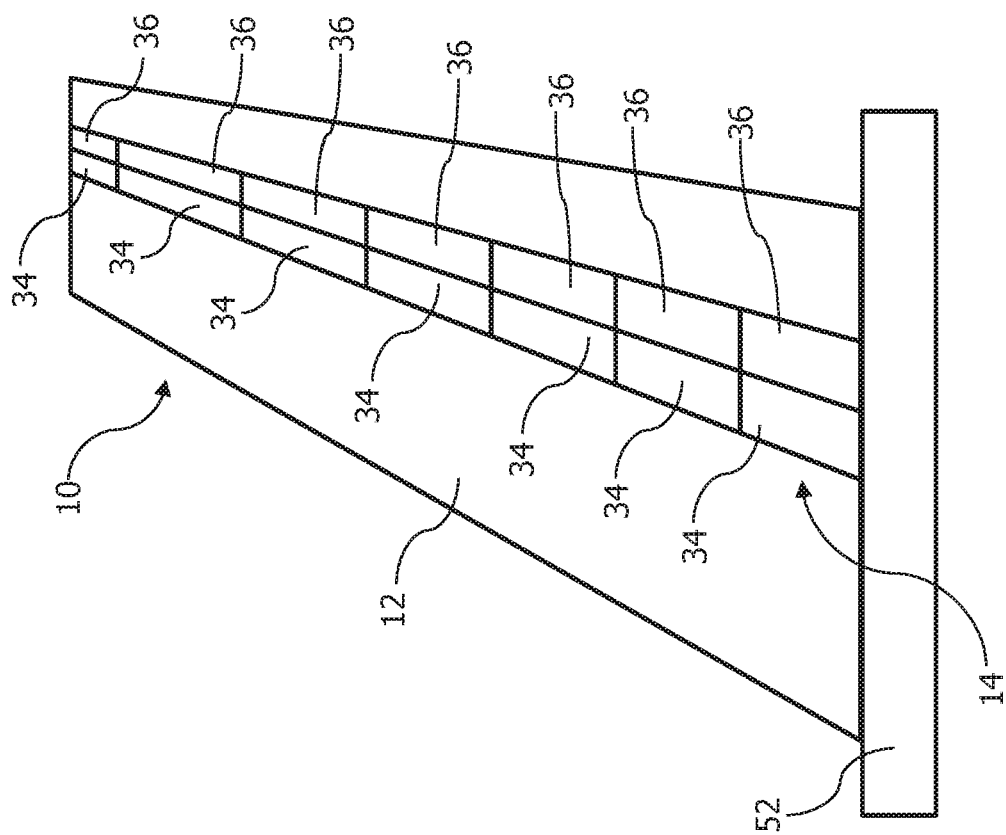
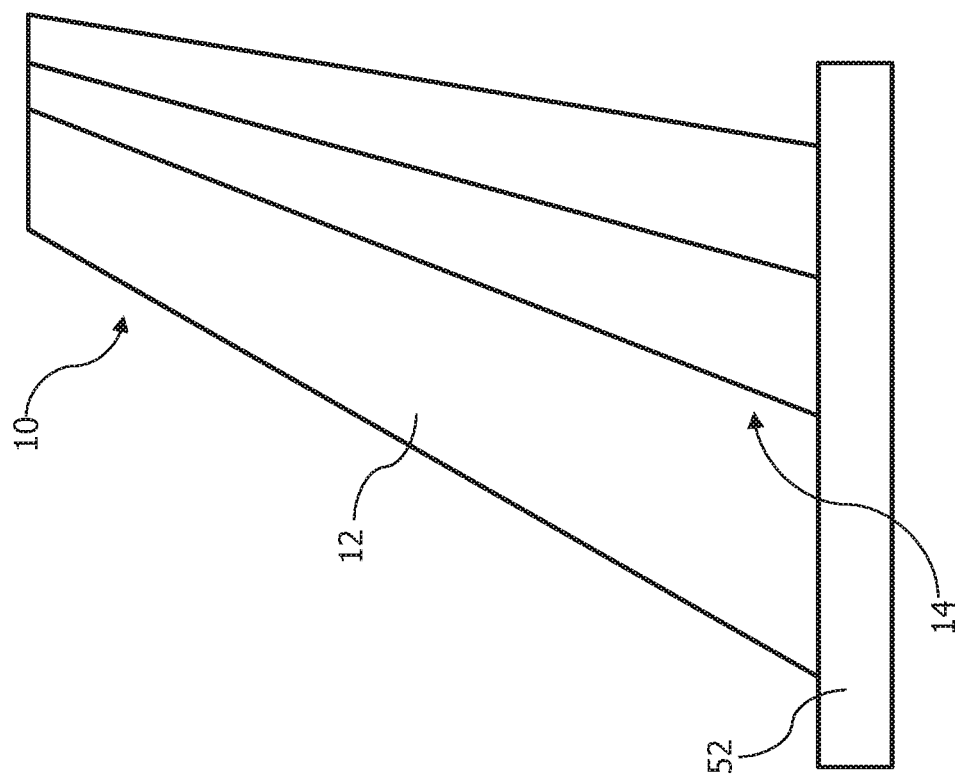

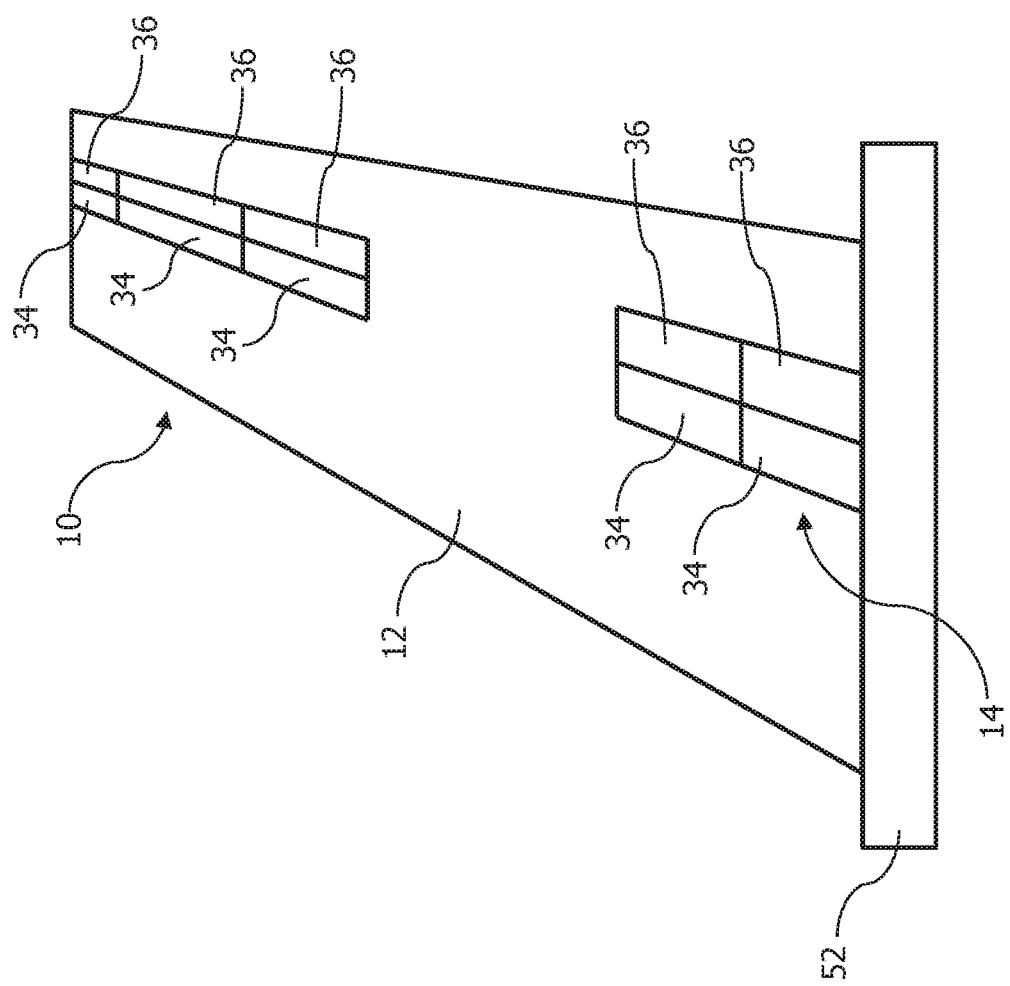

BOUNDARY-LAYER-INFLUENCING AERODYNAMIC PART AND METHOD FOR PRODUCING THE SAME

CROSS-REFERENCES TO RELATED APPLICATIONS

This application claims the benefit of the German patent application No. 10 2016 204 210.6 filed on Mar. 15, 2016, the entire disclosures of which are incorporated herein by way of reference.

BACKGROUND OF THE INVENTION

The invention relates to a boundary-layer-influencing aerodynamic part, an aircraft component equipped with such a boundary-layer-influencing aerodynamic part and a method for producing the same.

The suction and ejection of air in the region of a boundary layer flow on an aerodynamic component are known methods of influencing the boundary layer. These methods are used to avoid or delay a flow breakdown along a flow surface of the aerodynamic component, i.e., a transition from a laminar to a turbulent flow, in order to improve aerodynamic properties, in particular a flow resistance or lift coefficient, of the aerodynamic component.

Tangential suction and ejection or slot suction and ejection are currently known methods for influencing the boundary layer flow on an outer skin of an aircraft. For example, GB 25 22 531 A discloses an aircraft wing, the outer skin of which is provided with a slot for ejecting air in the direction of a boundary layer flow along the outer skin. One implementation of this method is found on the Lockheed F-104 "Starfighter" aircraft, which has an outlet slot on an upper side of the landing flaps for ejecting air. Bleed air taken from an engine is supplied to the outlet slot, due to which additionally accelerated air is ejected into the boundary layer flow along the landing flaps in such a way that stabilization of the laminar boundary air flow is achieved. The maximum lift coefficient of the landing flaps is increased by this effect, due to which the landing speed of the aircraft can be reduced.

Furthermore, the method of continuous suction and ejection of air along a porous external surface of an aerodynamic component is known from the prior art. DE 44 14 205 A1 describes an arrangement for boundary layer suction along an outer skin of an aircraft around which air flows. The arrangement comprises a multilayer construction through which air can flow, with a porous carrier layer, which is arranged on a supporting structure and to which a layer of microfiber fabric is applied. A similar arrangement is known from U.S. Pat. No. 5,618,363 A, in which an outer skin of an aircraft around which air flows is formed in some sections with a porous, carbon-fiber-reinforced thermoplastic layer, through which layer air can flow.

U.S. Pat. No. 7,275,720 B2 further discloses an arrangement for the continuous ejection of cooling air on an external surface of a spacecraft. The arrangement comprises a carrier structure, to which a porous ceramic foam layer is applied, through which cooling air can flow and which guides the cooling air along the carrier structure in the direction of a semi-permeable cover layer. The semi-permeable cover layer comprises a ceramic composite material which is applied to the ceramic foam layer by means of an adhesive. On re-entry of the spacecraft into the earth's atmosphere, cooling air is ejected along the ceramic foam layer from the semi-permeable cover layer to cool the outer skin of the spacecraft.

A commercial application of such methods for influencing the boundary layer to aerodynamic components, such as in passenger airliners, for example, does not currently take place.

SUMMARY OF THE INVENTION

An object of the invention is to provide an aerodynamic part with improved aerodynamic properties, which can be manufactured with a reduced outlay. Another object is to provide a method for the production of such an aerodynamic part.

A boundary-layer-influencing aerodynamic part comprises a carrier element, which is provided with at least one air passage aperture for guiding an air flow through the carrier element, an air guiding layer arranged on the carrier element and a cover layer constituting at least a part of a flow surface and being adapted or configured to have air flow through at least in some sections, and being, in particular, perforated.

The air guiding layer of the boundary-layer-influencing aerodynamic part is adapted or configured to have an air flow there through with an air flow that is supplied to the part, at least in certain operating phases of the part, through the cover layer and flows in the direction of the carrier element and/or by an air flow that is supplied to the part, at least in certain operating phases of the part, through the air passage aperture of the carrier element and flows in the direction of the cover layer.

In operating phases in which the air flow supplied through the cover layer to the part and flowing in the direction of the carrier element can flow through the air guiding layer, suction of air from a boundary layer flow on the flow surface is facilitated. Thus low-energy fluid from the boundary layer flow can be removed to avoid a flow breakdown on the flow surface, i.e., a transition from a laminar to a turbulent flow or to displace a flow breakdown position along the flow surface in the direction of the boundary layer flow and thereby delay a flow breakdown.

In operating phases in which the air flow supplied through the air passage aperture of the carrier element to the part and flowing in the direction of the cover layer can flow through the air guiding layer, on the other hand, ejection of air into the boundary layer flow on the flow surface is facilitated. By ejecting air into the boundary layer flow, a wall shear stress and thus a friction resistance on the flow surface can be reduced, due to which a flow breakdown can likewise be avoided or delayed.

Both the suction and the ejection of air in the region of the cover layer of the part permit a stabilization of the boundary layer flow along the flow surface, due to which the part can exhibit improved aerodynamic properties, such as a lower flow resistance or an improved lift coefficient, for example.

The cover layer of the part may constitute at least one section of a flow surface of an aerodynamic component. The aerodynamic component may be an aerodynamic component with a flow around it, i.e., a component on which air flows around the flow surface. Alternatively, the aerodynamic component may be an aerodynamic component with a flow on it, i.e., a component on which air flows on at least one side.

The aerodynamic part may be used in different application areas. For example, the part may be integrated into a wing of an aircraft. Furthermore, the part may be used in the region of a flow surface of a rotor, for example a wind turbine. In this application the aerodynamic part can help to increase efficiency of the wind turbine by stabilization of the boundary layer flow on the rotor. The part may also be used in the region of a flow surface of an air guiding channel, for example, of an air conditioning system. In this case the part can reduce turbulent flows and thus an associated noise emission in such systems.

The cover layer of the part is applied directly to the air guiding layer by means of an additive manufacturing method. By using an additive manufacturing method, it is possible to realize structural features of the part that are not realizable by manufacturing methods currently in use for such parts or are only realizable with a high outlay.

For example, no fastening means, such as a rivet, an adhesive layer, etc., are provided in the part to fix the cover layer to the air guiding layer. Since the cover layer is applied directly to the air guiding layer by means of an additive manufacturing method, a connection is achieved directly on the contact surfaces between the cover layer and the air guiding layer. Thus, a uniform adhesive force over the contact surfaces can be realized between the part components without an additional adhesive layer being disposed between these components.

Compared with known arrangements, in which a perforation is created by means of a separation method, such as drilling or laser processing, for example, no additional step is required to realize the perforation in the case of the present part. Effects on the mechanical properties of the part resulting from the heat input into the part arising due to such separation methods can thus be avoided.

Due to the solution proposed here, a part is provided with advantageous mechanical properties, which has a flat and uniformly constituted connection between the cover layer and the air guiding layer without thereby influencing the functionality of the part. Since the part still has a simple construction and does not require any additional fastening means for fixing the cover layer, this can be produced with a reduced outlay.

In a further development of the part, the air guiding layer is applied directly to the carrier element by means of an additive manufacturing method. Alternatively or in addition, the carrier element may be produced by means of an additive manufacturing method. Due to the use of an additive manufacturing method, no additional fastening means are required even for fixing the air guiding layer on the carrier element. Furthermore, a structure of the individual part layers of any complexity can be realized by this without substantially increasing the outlay for production of the part.

A melting layer method (FDM (fused deposition modelling) method), a wire-feed method, selective laser sintering or other methods may be used as an additive manufacturing method for the cover layer, the air guiding layer and/or the carrier element. The cover layer, air guiding layer and/or the carrier element may directly adjoin one another and be produced from the same material. Preferably, at least the cover layer and the air guiding layer are produced from the same material. Furthermore, the use of an additive manufacturing method to produce the part makes it possible for the cover layer, the air guiding layer and/or the carrier element to comprise different materials and substances, wherein these may be applied directly to one another and joined to one another without additional fastening means.

The carrier element is preferably provided for the take-up of forces and thus for mechanical stabilization of the part. The carrier element may be a basic structure of the aerodynamic component. Alternatively, the carrier element may be a separate part component from the basic structure of the aerodynamic component, which is fitted into the basic structure and may be joined fixedly to this. For example, the carrier element may be joined fixedly to the basic structure by a fastening means, such as a rivet or an adhesive layer, for example.

The at least one air passage aperture with which the carrier element is provided may be provided to guide an air flow into the air guiding layer or to guide it out of the same. The air flow flowing through the part may be guided in this case by the at least one air passage aperture from the air guiding layer in the direction of an air guiding channel of the basic structure of the aerodynamic component or from the air guiding channel in the direction of the air guiding layer. The carrier element may accordingly be arranged in such a way that it separates the air guiding layer and the cover layer from the air guiding channel.

In a preferred embodiment of the part, the carrier element is provided with a recess that takes up at least the air guiding layer. The cover layer may further be arranged with the air guiding layer in the recess of the carrier element. The side walls and/or a floor of the recess may be provided with the at least one air passage aperture. An edge section of the carrier element adjoining the recess may have an external surface that constitutes another part of the flow surface of the part. The external surface of the edge section of the carrier element that constitutes the other part of the flow surface may directly adjoin the cover layer. In the transition area between the cover layer constituting one part of the flow surface and the carrier element constituting the other part of the flow surface, the flow surface may be formed substantially continuous, in particular flat. By being able to produce the cover layer directly adjoining the edge section of the carrier element by means of an additive manufacturing method, it is possible to ensure a substantially flat transition between the cover layer and the edge section of the carrier element.

The cover layer of the part may be perforated, at least in sections. In particular, the cover layer may be provided with perforation openings in the form of through openings, which have a defined shaped and a regular arrangement in relation to one another. The cover layer may be a microperforated cover layer, in particular. The perforation openings may have an identical shape and an identical spacing from one another along the perforated section of the cover layer. Alternatively, the perforation openings may have different shapes, in particular varying cross-sectional areas which can be flowed through, and/or a varying spacing from one another. Furthermore, the perforation openings may have a longitudinal axis that is disposed perpendicular to an outer side of the cover layer constituting a part of the flow surface.

In a further development, the longitudinal axis of the perforation openings may be arranged offset at an angle to the outer side of the cover layer. In particular, the longitudinal axis of the perforation openings may be arranged offset in the direction of the boundary layer flow at an angle smaller than 90° to the outer side of the cover layer. In certain operating phases of the part, a partially tangential suction or ejection can thereby take place, so that an air flow ejected from the component into the boundary layer flow has a velocity component in the direction of the boundary layer flow and an air flow sucked from the boundary layer flow has a velocity component opposed to the direction of the boundary layer flow.

Alternatively or in addition, the cover layer may comprise a porous material through which air can flow. The porous material may have an open porosity in this case.

The cover layer may further comprise at least one airtight, in particular non-perforated, edge section. The airtight edge section of the cover layer is preferably arranged adjoining the section of the cover layer through which air can flow. On an underside of the cover layer, which is opposite to the outer side of the cover layer constituting a part of the flow surface, the cover layer may be connected to the carrier element. The edge section of the cover layer may be arranged in this case on the edge section of the carrier element. Alternatively the edge section of the cover layer may be mounted on a section of the basic structure of the aerodynamic component. The edge section of the cover layer may be applied directly to the carrier element and/or the basic structure of the aerodynamic component by means of an additive manufacturing method in this case.

The air guiding layer of the part may comprise at least one porous section, which has an air-permeable porous material with an open porosity. The porous section may preferably be adapted or configured to have an air flow there through with the air flowing through the part. The use of a porous material has the effect that a uniform flow through the air guiding layer can be achieved. Alternatively or in addition, the air guiding layer may comprise at least one air guiding channel.

By the use of an additive manufacturing method for producing the cover layer and/or the air guiding layer, a complex structure of the respective layers may be realized simply. For example, the cover layer and/or the air guiding layer can comprise sections that have different open porosities. A transition between these sections may be configured in such a way that the cover layer and/or the air guiding layer has/have an incrementally or substantially continuously varying open porosity, in order to provide a continuous transition region between the sections.

The ejection or suction of air in the region of the boundary layer flow may take place on the basis of a pressure difference between a pressure prevailing on the outside of the section of the cover layer through which air can flow and a pressure prevailing in the area of the air passage aperture. To influence this pressure difference, the air passage aperture of the carrier element may be connected to an air conveying device for the suction and/or ejection of the air flowing through the part. The air conveying device may be constituted in the form of a pump or a compressor, which can be driven by bleed air taken from an engine when the part is used in an aircraft, in particular.

In a further development, the part may comprise a plurality of regions with different air volume flow removal capacities from an air layer adjacent to the cover layer and/or different air volume flow supply capacities into the air layer adjacent to the cover layer. In the context of the present disclosure, the property of one of the plurality of regions of the part to eject a specific air volume flow into the air layer adjacent to the cover layer, in particular the boundary layer flow, or to aspirate it from the same, relative to a surface of the section of the cover layer through which air can flow, is understood as the air volume flow removal capacity. In other words, in a first region of the part, which has a first air volume flow removal capacity and/or air volume flow supply capacity that is greater than a second air volume flow removal capacity and/or air volume flow supply capacity of a second region, given the same area of the section of the cover layer through which air can flow in the first and second region, a larger volume flow can be ejected into the air layer adjacent to the cover layer and/or aspirated from the same in the first region than in the second region.

The different regions of the part may be arranged in the direction of the boundary layer flow behind one another or adjacent to one another along the flow surface. In particular, the part may be formed in such a way that arranged in a front area of the flow surface in the direction of the boundary layer flow are a first region with a first air volume flow removal capacity and/or air volume flow supply capacity and a second region adjoining this in the direction of the boundary layer flow with a greater second air volume flow removal capacity and/or air volume flow supply capacity compared with the first region. Due to the plurality of regions of the part with different air volume flow removal capacities and/or different air volume flow supply capacities, a targeted influencing of the boundary layer that is adapted to the form or the requirements of the aerodynamic component can be achieved by the part.

To form the different air volume flow removal capacities and/or air volume flow supply capacities, the regions may have different cross-sectional areas of the cover layer which are adapted or configured to have an air flow there through. In particular, the regions may have a different density of perforation openings provided in the cover layer and/or perforation openings of different sizes provided in the cover layer. Alternatively or in addition, the cover layer may have different open porosities in the regions. For example, the cover layer may have regions with different volume shares of open pores.

Alternatively or in addition, the regions may have different cross-sectional areas of the air guiding layer through which air can flow. For example, the air guiding layer may have regions with different volume shares of open pores. A cross-sectional area of the air guiding layer through which air can flow may be larger in the respective regions than a cross-sectional area of the cover layer through which air can flow.

Alternatively or in addition, the regions may have different cross-sectional areas of the air passage apertures of the carrier element which are adapted or configured to have an air flow there through. For example, the regions may have a different number and/or density of air passage apertures provided in the carrier layer and/or air passage apertures of different sizes provided in the carrier layer.

In a further development, the plurality of regions may be sealed off from one another by an air-impermeable partition wall. In this case the carrier element of the part may have at least one air passage aperture in each of the plurality of regions. The partition wall sealing the plurality of regions off from one another can constitute an element of the air guiding layer. Alternatively, the partition wall may be formed by the carrier element, wherein the carrier element may form a separate recess for each of the plurality of regions, in which at least one respective section of the air guiding layer is embedded.

An aircraft component, in particular a wing or a tail unit, is equipped with a boundary-layer-influencing aerodynamic part described above.

In a method for producing a boundary-layer-influencing aerodynamic part, a carrier element is provided, which is provided with at least one air passage aperture for guiding an air flow through the carrier element. An air guiding layer is applied to the carrier element. The air guiding layer is adapted or configured to have an air flow there through with an air flow supplied to the part, at least in certain operating phases of the part, through the cover layer and flowing in the direction of the carrier element and/or is adapted or configured to have an air flow there through with an air flow supplied to the part, at least in certain operating phases of the part, through the air passage aperture of the carrier element and flowing in the direction of the cover layer. A cover layer constituting at least a part of a flow surface and being adapted or configured to have an air flow there through at least in sections, is applied directly to the air guiding layer by means of an additive manufacturing method.

The air guiding layer may be applied directly to the carrier element by means of an additive manufacturing method. The carrier element may further be produced by means of an additive manufacturing method. The application of the cover layer to the air guiding layer, the application of the air guiding layer to the carrier element and the production of the carrier element may be produced in a single manufacturing process step by means of an additive manufacturing method.

BRIEF DESCRIPTION OF THE DRAWINGS

Preferred practical examples of the invention are explained in greater detail below with reference to the enclosed schematic drawings, wherein FIGS. 4 to 6 show a top view of the aerodynamic component shown in FIG. 1 of other embodiments.

DETAILED DESCRIPTION OF THE PREFERRED EMBODIMENTS

Figure 1:
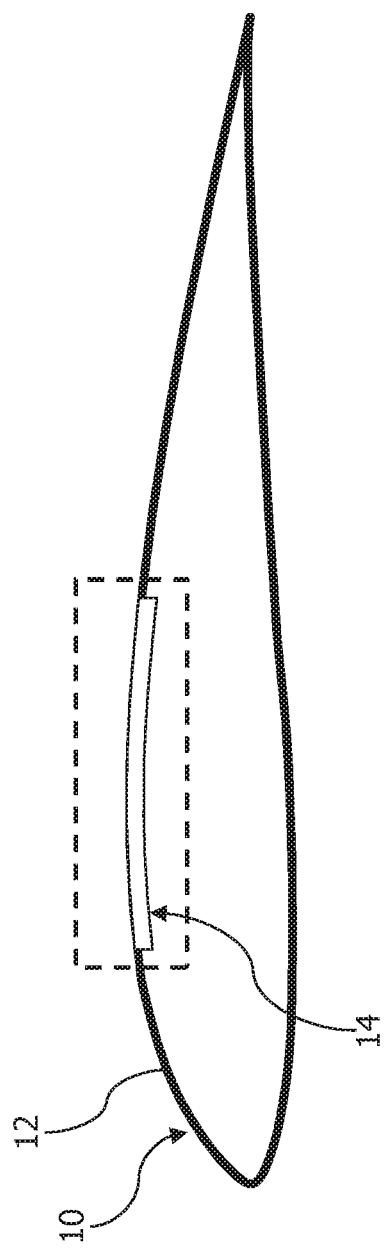
FIG. 1 shows a schematic profile diagram of an aerodynamic component with a boundary-layer-influencing aerodynamic part.

FIG. 1 shows a profile of an aerodynamic component 10, in particular an aircraft component, which comprises a circumferential flow surface 12. A boundary-layer-influencing part 14 is integrated into the aerodynamic component 10 on the upper side.

Figure 2:
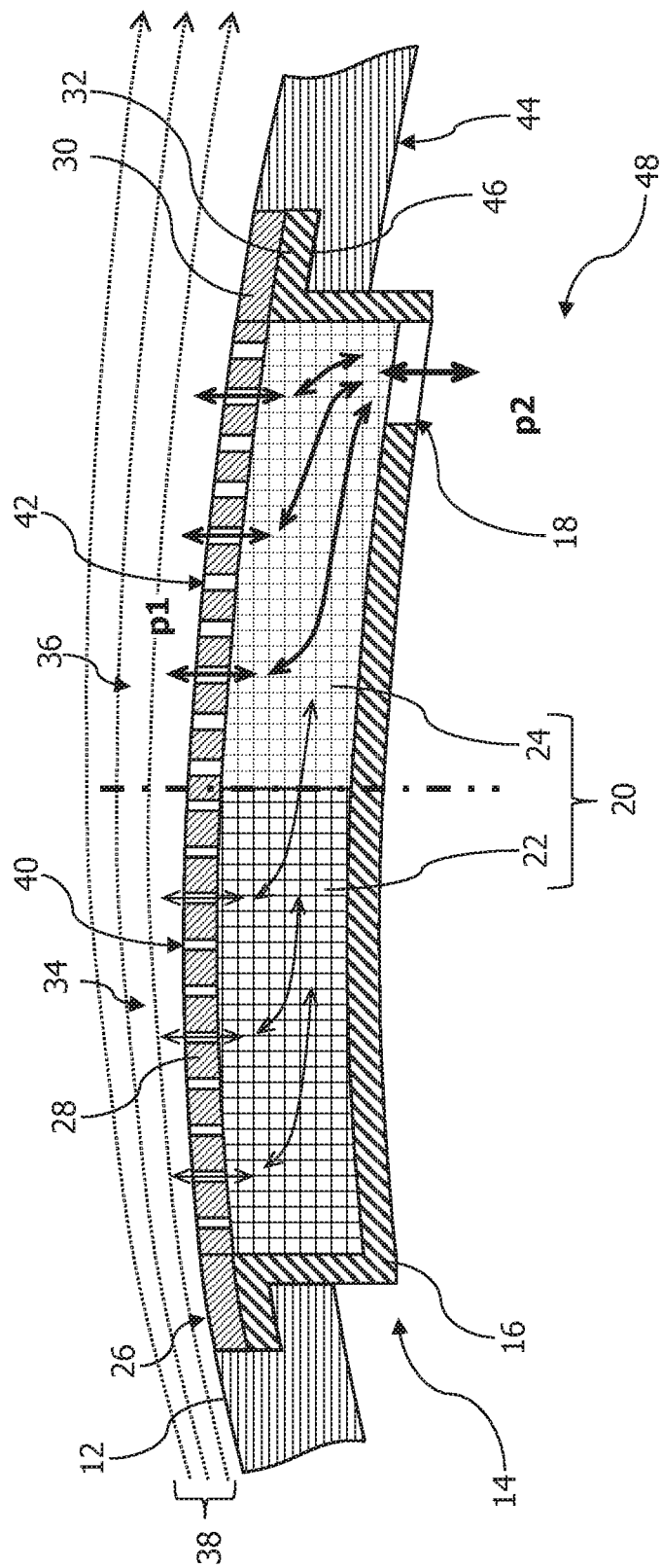
FIG. 2 shows an enlarged section of the aerodynamic component shown in FIG. 1 with a first embodiment of the boundary-layer-influencing aerodynamic part.

FIG. 2 shows an enlarged section of the area indicated by dotted lines in FIG. 1. As shown in FIG. 2, the part 14 comprises a carrier element 16, which is provided with at least one air passage aperture 18 for guiding an air flow through the carrier element 16. An air guiding layer 20 is disposed on the carrier element 16, wherein the air guiding layer 20 comprises a first porous air guiding section 22 and a second porous air guiding section 24. The first and second air guiding sections 22, 24 are applied directly to the carrier element 16 by means of an additive manufacturing method. A part of the flow surface 12 is constituted by a cover layer 26, through which air can flow and which is perforated in a section 28. Alternatively or in addition, the cover layer 26 may comprise a porous material in the section 28 through which air can flow. The cover layer 26 is applied directly to the air guiding layer 20 by means of an additive manufacturing method.

The air guiding layer 20 can have an air flow there through, at least in certain operating phases of the part 14, by an air flow supplied to the part 14 through the cover layer 26 and flowing in the direction of the carrier element 16, and at least in certain operating phases of the part 14 by an air flow supplied to the part 14 through the air passage aperture 18 of the carrier element 16 and flowing in the direction of the cover layer 26, as indicated by arrows in FIG. 2.

The cover layer 26 has the perforated section 28 through which air can flow and which extends along the air guiding layer 20 and is in direct contact with an underside arranged opposite the flow surface 12. Adjacent to the perforated section 28, the cover layer 26 comprises an airtight, non-perforated edge section 30. The carrier element 16 is provided with a recess, in which the air guiding layer 20 is arranged. Furthermore, the carrier element 16 comprises an edge section 32, on which the non-perforated edge section 30 of the cover layer 26 is directly mounted.

A first region 34 and a second region 36 of the part 14 are formed with different air volume flow removal capacities from an air layer 38, which is adjacent to the cover layer 26 and forms the boundary layer flow, and with different air volume flow supply capacities into the air layer 38. The second region 36 is arranged behind the first region 34 in the flow direction of the boundary layer flow. The first region 34 is preferably arranged here in an area of a front flow separation point of the aerodynamic component 10, in order to facilitate stabilization of the boundary layer flow.

In the embodiment shown here, the first region 34 has a first air volume flow removal capacity and air volume flow supply capacity, which are each smaller than a second air volume flow removal capacity and air volume flow supply capacity of the second region 36. A growing pressure gradient in the direction of the profile trailing edge inducing a flow breakdown can be effectively counteracted by this arrangement. A targeted influencing of the boundary layer flow can thus take place on the flow surface 12.

In the first region 34, the perforated section 28 of the cover layer 26 has first perforation openings 40 and in the second region 36 second perforation openings 42, wherein a size and density of the first perforation openings 40 in the first region 34 are smaller than a size and density of the second perforation openings 42 in the second region 36. In other words, a cross-sectional area of the cover layer 26 through which air can flow is smaller in the first region 34 than in the second region 36.

In the first region 34, the air guiding layer 20 comprises the first porous air guiding section 22 and in the second region 36 the second porous air guiding section 24. The first porous air guiding section 22 has a first open porosity, which is smaller than a second open porosity of the second porous air guiding section 24. Thus a cross-sectional area of the air guiding layer 20 through which air can flow is smaller in the first region 34 than in the second region 36.

The air passage aperture 18 of the carrier element 16 is arranged in a floor of the recess in the second region 36, so that a cross-sectional area of the carrier element 16 through which air can flow is smaller in the first region 34 than in the second region 36.

Since the air guiding layer 20 is applied to the carrier element 16 and the cover layer 26 is applied in sections to the air guiding layer 20 and the carrier element 16 by means of an additive manufacturing method, the part 14 comprises no fastening means to fix the air guiding layer 20 and the cover layer 26 in the part 14.

The part 14 shown here can be produced in one manufacturing step by means of an additive manufacturing method and then fitted into the aerodynamic component 10. As shown in FIG. 2, the part 14 is fastened on a basic structure 44 of the aerodynamic component 10 forming another part of the flow surface 12. The non-perforated edge section 30 of the cover layer 26 and the edge section 32 of the carrier element 16 of the part 14 are arranged here in a side wall 46 of the basic structure 44, which wall forms a step.

The aerodynamic component 10 has an air guiding channel 48 indicated in FIG. 2, which is delimited by the basic structure 44 and the part 14 and through which the air flow flowing through the part 14 can flow. The air guiding channel 48 can be connected in a fluid-guiding connection to a conveying device, not shown here, for the suction and/or ejection of the air flowing through the part 14. The suction and/or ejection of the air flowing through the part 14 in the area of the air layer 38 can take place on the basis of a pressure difference of a first pressure p1 prevailing in the air layer 38, which pressure can vary along the flow surface 12, and a second pressure p2 prevailing in the air guiding channel 48. This pressure difference can be influenced by the conveying device in order to control the suction and/or ejection of the air flowing through the part 14.

Figure 3:
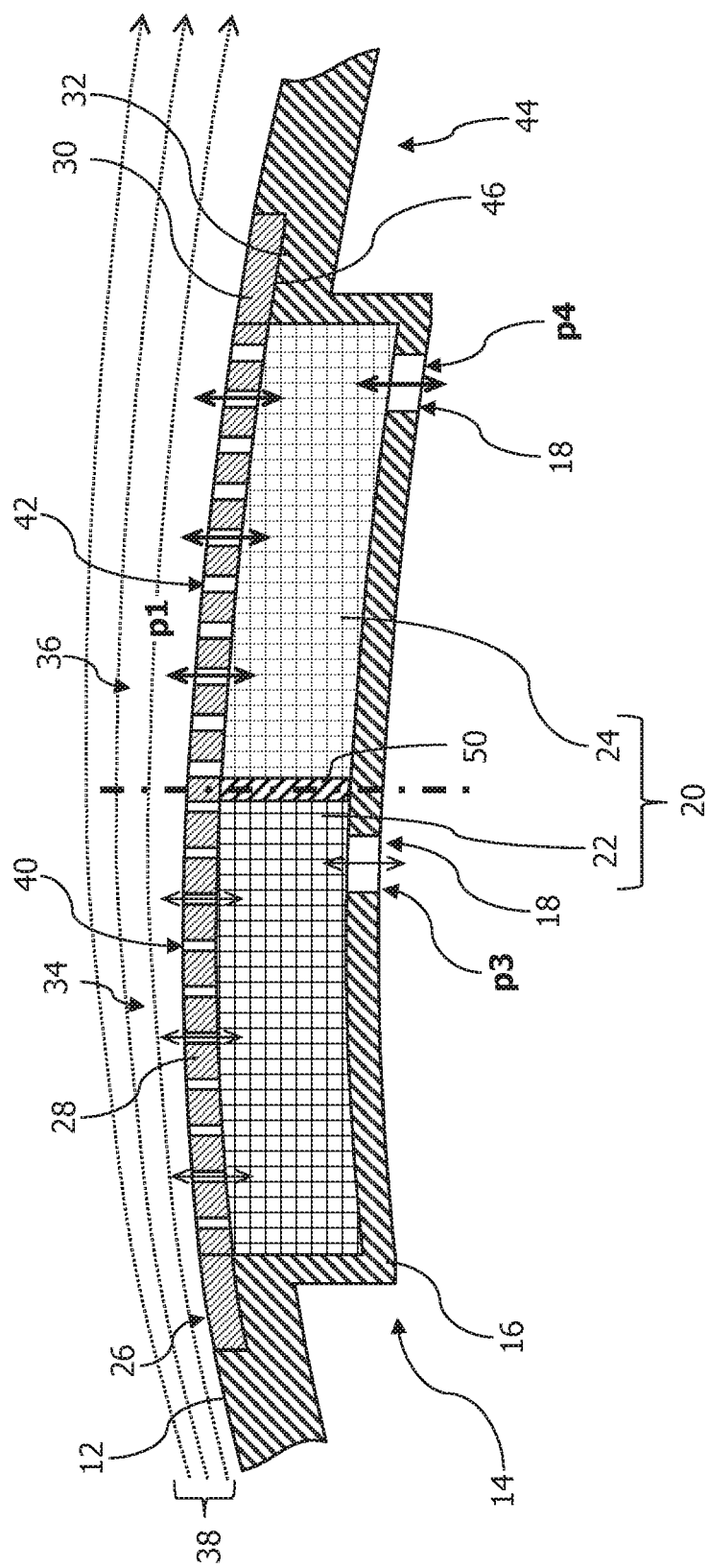
FIG. 3 shows an enlarged section of the aerodynamic component shown in FIG. 1 with a second embodiment of the boundary-layer-influencing aerodynamic part.

FIG. 3 shows a second embodiment of the part 14. In contrast to the first embodiment of the part 14, the carrier element 16 constitutes the basic structure 44 of the aerodynamic component 10. In a manufacturing method to produce the part 14, the air guiding layer 20 can be applied directly to the carrier element 16 and thus to the basic structure 44 of the aerodynamic component 10.

The part 14 shown in FIG. 3 also comprises an air-impermeable partition wall 50, which seals the first region 34 and the second region 36 off from one another. The partition wall 50 is arranged in the air guiding layer 20 and directly adjoining the first and second porous air guiding section 22, 24. Due to the provision of the air-impermeable partition wall 50, a pressure prevailing in the first air guiding section 22 of the first region 34 can be adjusted independently of a pressure prevailing in the second air guiding section 24 of the second region 36. In other words, air flows that have been separated from one another can flow through the part 14 in the first and second region 34, 36. The carrier element 16 is provided in the first region 34 and in the second region 36 of the part 14 respectively with at least one air passage aperture 18. In particular, the part can be provided in a longitudinal direction of the aerodynamic component 10, i.e., in a direction substantially perpendicular to the flow direction, with several air passage apertures 18. The suction and/or ejection of the air flowing through the part 14 in the first region 34 can be controlled by a pressure p3 prevailing in the area of the air passage aperture 18 of the first region 34. The suction and/or ejection of the air flowing through the part 14 in the second region 36 can accordingly be controlled by a pressure p4 prevailing in the area of the air passage aperture 18 of the second region 36. The pressure p3 prevailing at the air passage aperture 18 of the first region 34 and the pressure p4 prevailing at the air passage aperture 18 of the second region 36 can be different or of the same magnitude. The air passage apertures 18 in the first and the second region 34, 36 can be connected via a common air guiding channel to the same air conveying device. Alternatively, the air passage apertures 18 in the first and second region 34, 36 can be connected via different air guiding channels to the same air conveying device or to different air conveying devices, in order to control the air flow through the first and the second region 34, 36 independently of one another.

FIG. 4 shows a schematic top view of another embodiment of the aerodynamic component 10 shown in FIG. 1 in the form of a wing mounted on an aircraft fuselage 52. As shown in FIG. 4, the part 14 comprised in the aerodynamic component 10 extends along a longitudinal axis of the aerodynamic component 10. In other words, the part 14 extends from a first end section of the aerodynamic component 10 mounted on the aircraft fuselage 52 in the direction of a free second end section of the aerodynamic component 10 opposite this.

FIG. 5 shows a top view of another embodiment of the aerodynamic component 10, in which the part 14 comprises, compared with the embodiment shown in FIG. 4, several first regions 34 and several second regions 36 of the part 14 with different air volume flow removal capacities and/or different air volume flow supply capacities. The several first regions 34 can comprise different air volume flow removal capacities and/or different air volume flow supply capacities. The several second regions 36 can correspondingly comprise different air volume flow removal capacities and/or different air volume flow supply capacities. The several first regions 34 and the several second regions 36 are arranged respectively adjoining one another in the longitudinal direction of the aerodynamic component 10. As shown in FIG. 5, the different first and second regions 34, 36 have different areas of perforated sections 28 through which air can flow.

FIG. 6 shows another embodiment of the aerodynamic component 10. Compared to the embodiments shown in FIGS. 4 and 5, the part 14 is not formed in a central wing section in the longitudinal direction of the aerodynamic component 10. In other words, the part 14 extends in the longitudinal direction of the aerodynamic component 10 not along an entire wing surface, but only in the area of the first end section and in the area of the second end section of the aerodynamic component 10.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A boundary-layer-influencing aerodynamic part, comprising:
    a carrier element provided with at least one air passage aperture for guiding an air flow through the carrier element,
    an air guiding layer arranged on the carrier element, and
    a cover layer forming at least a part of a flow surface and being configured to have an air flow there through at least in sections,
        the air guiding layer is configured to
            have an air flow there through with an air flow supplied to the boundary-layer-influencing aerodynamic part, at least in certain operating phases of the boundary-layer-influencing aerodynamic part, through the cover layer and flowing in the direction of the carrier element, and
            have an air flow there through with an air flow supplied to the boundary-layer-influencing aerodynamic part, at least in certain operating phases of the boundary-layer-influencing aerodynamic part, through the air passage aperture of the carrier element and flowing in the direction of the cover layer, and
        the cover layer is applied directly to the air guiding layer via an additive manufacturing method.

2. The boundary-layer-influencing aerodynamic part according to claim 1, wherein at least one of the air guiding layer is applied directly to the carrier element by means of an additive manufacturing method, or the carrier element is produced by means of an additive manufacturing method.

3. The boundary-layer-influencing aerodynamic part according to claim 1, wherein the carrier element is provided with a recess, which takes up at least the air guiding layer.

4. The boundary-layer-influencing aerodynamic part according to claim 3, wherein the cover layer has at least one airtight edge section.

5. The boundary-layer-influencing aerodynamic part according to claim 4, wherein the edge section of the cover layer is mounted on an edge section of the carrier element or a section of a basic structure.

6. The boundary-layer-influencing aerodynamic part according to claim 1, wherein the cover layer is at least one of perforated at least in sections, or comprises a porous material configured to have an air flow there through.

7. The boundary-layer-influencing aerodynamic part according to claim 1, wherein the air guiding layer comprises a porous material.

8. The boundary-layer-influencing aerodynamic part according to claim 1, wherein the air passage aperture of the carrier element is connected to an air conveying device for at least one of the suction or ejection of air flowing through the boundary-layer-influencing aerodynamic part.

9. The boundary-layer-influencing aerodynamic part according to claim 1, which comprises a plurality of regions with at least one of different air volume flow removal capacities from an air layer adjacent to the cover layer, or different air volume flow supply capacities to the air layer adjacent to the cover layer.

10. The boundary-layer-influencing aerodynamic part according to claim 9, wherein the regions have different cross-sectional areas of at least one of the cover layer, the air guiding layer, or the air passage aperture of the carrier element, which are configured to have an air flow there through, and wherein in the respective regions a cross-sectional area of the air guiding layer which is configured to have an air flow there through is larger than a cross-sectional area of the cover layer which is configured to have an air flow there through.

11. The boundary-layer-influencing aerodynamic part according to claim 9, wherein at least one of the regions have a different density of perforation openings provided in the cover layer, the regions have perforation openings of different sizes provided in the cover layer, the cover layer has different open porosities in the regions, the regions have air guiding layer sections with different open porosities, the regions have a different number of air passage apertures provided in the carrier layer, or the regions have air passage apertures of different sizes provided in the carrier layer.

12. The boundary-layer-influencing aerodynamic part according to claim 11, wherein the regions are sealed off from one another by an air-impermeable partition wall.

13. An aircraft component which comprises a boundary-layer-influencing aerodynamic part according to claim 1.

14. The aircraft component according to claim 1, wherein the component comprises a wing unit.

15. The aircraft component according to claim 1, wherein the component comprises a tail unit.

16. A method for producing a boundary-layer-influencing aerodynamic part, comprising the following steps:

providing a carrier element, which is provided with at least one air passage aperture, applying an air guiding layer to the carrier element, wherein the air guiding layer is configured to have an air flow there through with an air flow supplied to the boundary-layer-influencing aerodynamic part, at least in certain operating phases of the boundary-layer-influencing aerodynamic part, through the cover layer and flowing in the direction of the carrier element, and to have an air flow there through with an air flow supplied to the boundary-layer-influencing aerodynamic part, at least in certain operating phases of the boundary-layer-influencing aerodynamic part, through the air passage aperture of the carrier element and flowing in the direction of the cover layer, and applying a cover layer constituting at least a part of a flow surface and being configured to have an air flow there through at least in sections, directly to the air guiding layer by means of an additive manufacturing method.

17. The method according to claim 16, wherein at least one of the air guiding layer is applied directly to the carrier element via an additive manufacturing method, or the carrier element is produced via an additive manufacturing method.

* * * * *